United States Patent
Kullmann et al.

[11] Patent Number: 6,158,324
[45] Date of Patent: Dec. 12, 2000

[54] SAW BLADE AND METHOD FOR ITS PRODUCTION

[75] Inventors: Jörg H. Kullmann; Manfred Fluhrer, both of Spangenberg, Germany

[73] Assignee: WIKUS-Sagenfabrik Wilhelm H. Kullmann GmbH & Co. KG, Spangenberg, Germany

[21] Appl. No.: 09/146,894

[22] Filed: Sep. 3, 1998

[30] Foreign Application Priority Data

Sep. 8, 1997 [DE] Germany ............................ 197 39 074

[51] Int. Cl.[7] .................................................. B23D 57/00
[52] U.S. Cl. ................................ 83/848; 83/850; 83/851; 408/206
[58] Field of Search .............................. 83/835, 837, 839, 83/854, 855; 408/206, 207, 224

[56] References Cited

U.S. PATENT DOCUMENTS

| | | | |
|---|---|---|---|
| 4,587,876 | 5/1986 | Erhardt et al. ............................ | 83/839 |
| 4,867,026 | 9/1989 | Henning et al. .......................... | 83/835 |
| 5,410,935 | 5/1995 | Holston et al. ........................... | 83/851 |
| 5,477,763 | 12/1995 | Kullman .................................... | 83/846 |
| 5,803,678 | 9/1998 | Korb et al. ............................... | 408/206 |

*Primary Examiner*—Lee Young
*Assistant Examiner*—Sean Smith
*Attorney, Agent, or Firm*—Thomas, Kayden, Horstmeyer & Risley

[57] ABSTRACT

A saw blade comprising a basic body (8) lying in a longitudinal center plane (9) and having an edge and including along its edge a group (6) of recurring teeth (1, 2, 3, ... ), the group (6) comprising at least one unset leading tooth (1) being provided with a phase and having an effective cutting-edge section (10) and a preferably even number of trailing teeth (2, 3, ... ). The leading tooth (1) has a larger height than all of the trailing teeth (2, 3, ... ). All of the trailing teeth (2, 3, ... ) have different plastic deformations at their tips (28) by displacements of material in the running direction (24) of the saw blade. Each of the trailing teeth (2, 3, ... ) have both a positive enlarged rake angle (gamma$_2$, gamma$_3$, ... ) and a reduced height (h$_2$, h$_3$, ... ) with respect to the leading tooth (1) produced by different plastic deformations.

12 Claims, 12 Drawing Sheets

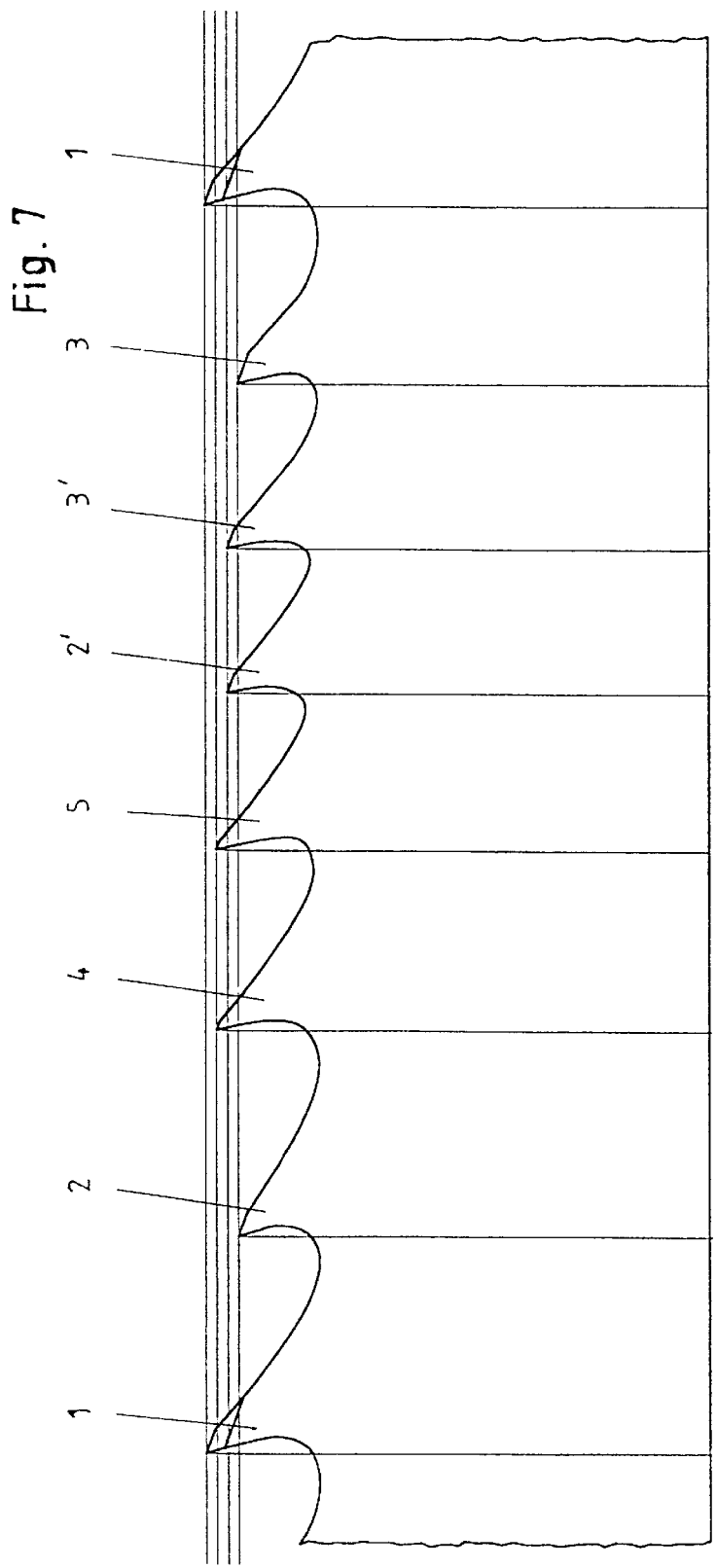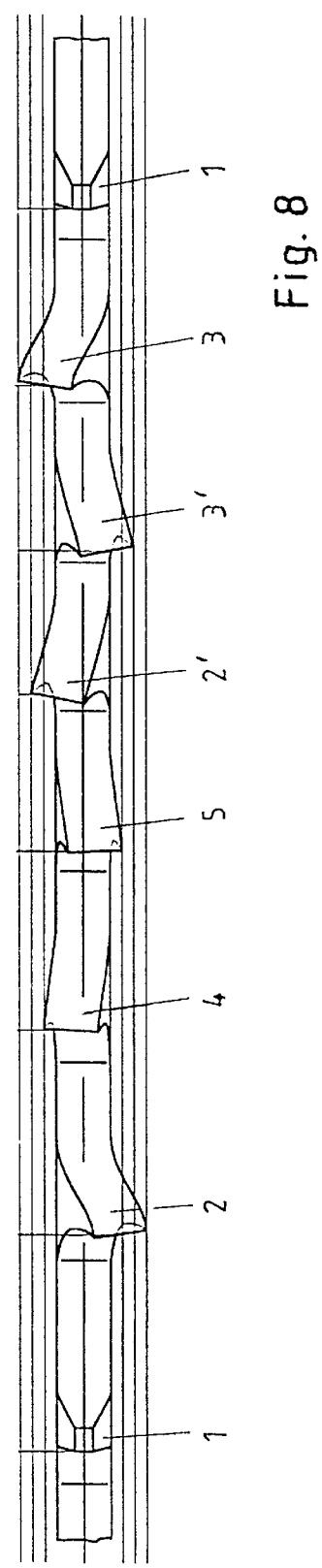

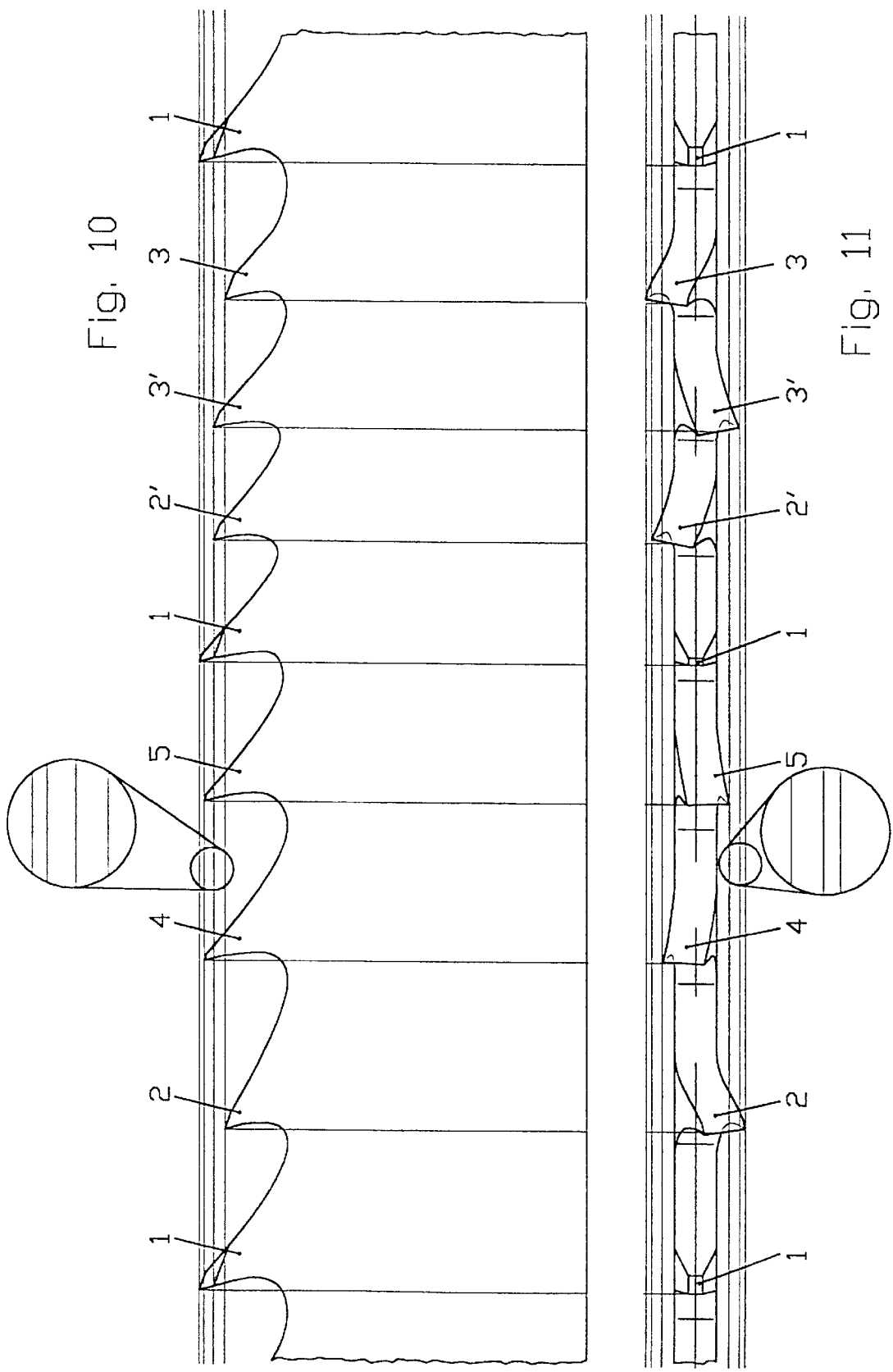

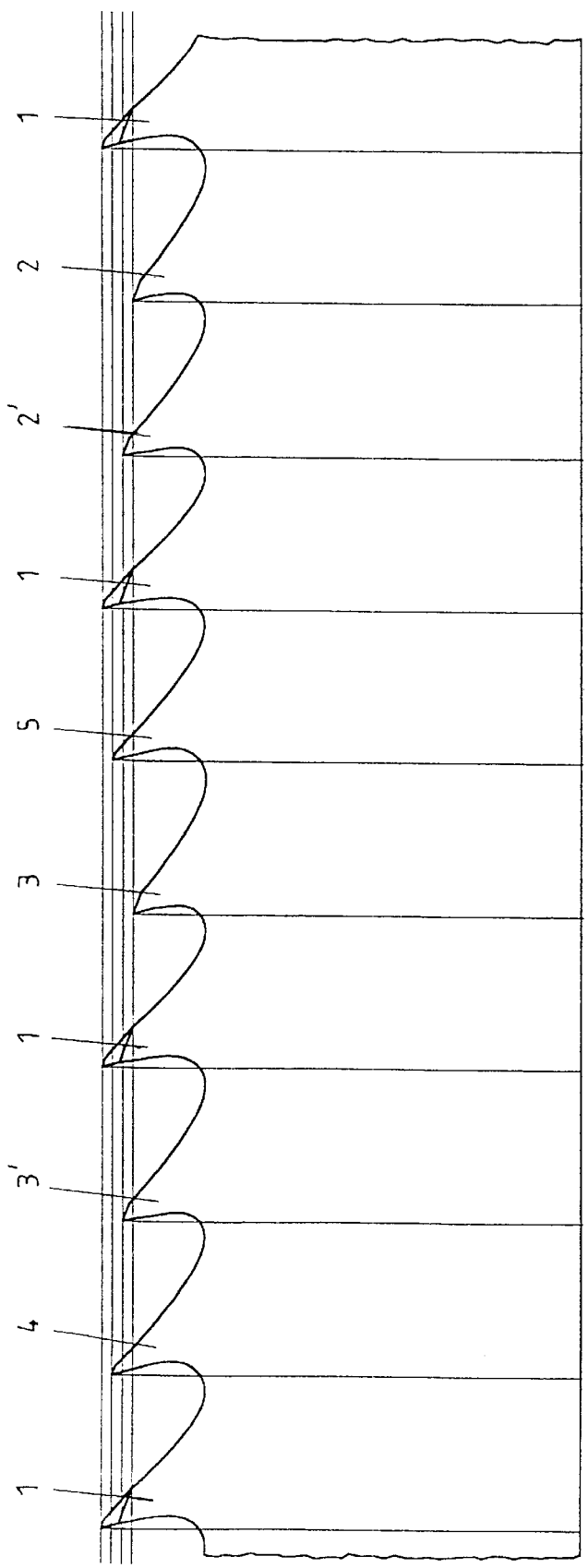
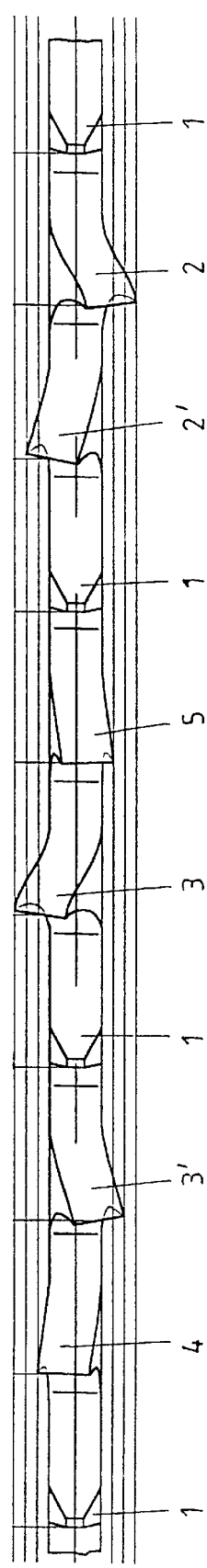
Fig. 16
Fig. 17

SAW BLADE AND METHOD FOR ITS PRODUCTION

FIELD OF THE INVENTION

The invention relates to a saw blade, comprising a basic body lying in a longitudinal center plane and having an edge and including along its edge a group of recurring teeth. The group comprises at least one unset leading tooth being provided with a phase and having an effective cutting-edge section (10). A preferably even number of trailing teeth are provided. The leading tooth has a larger height than all of the trailing teeth. The invention can be applied both in the case of a band saw blade, that is a saw blade with linear arrangement of the teeth one behind the other, and in the case of a circular saw blade. In general there is provided only one leading tooth in the group. The trailing teeth can have a common height but also unequal heights are possible, especially for pair by pair of the trailing teeth. The invention can be applied especially in connection with a raw band of bimetal.

BACKGROUND OF THE INVENTION

A saw blade of the kind mentioned above is known from DE 43 24 411 A1. The saw blade comprises a basic body having unset and set teeth the tips of which are made from a metal being harder than the material of the basic body. A material for the tips is tungsten carbide for example but also high-speed steel. The teeth are arranged in recurring groups or cycles. The group having the smallest number of teeth would be a group of three teeth, one unset leading tooth and two trailing teeth being set to the left and right respectively. The leading tooth has a height which is larger than the height of each of the trailing teeth. The leading tooth is provided with a phase, i.e. comprises a cutting-edge section in the middle extending perpendicular to a longitudinal center plane of the saw band followed symmetrically by an inclined section left and right. The difference between the height of the leading tooth and the heights of the trailing teeth and the phase angle are designed large so that the projection view of the teeth in the running direction of the saw blade during work the inner edges of the trailing teeth lie in the circumference of the leading tooth and the outer edges of the leading tooth overly the trailing teeth partly so that the overlaid parts do not take cutting work during use. The cutting sections of all of the teeth normally are made by grinding, i.e. by a precise but costly forming step by which the two different heights result also.

A further saw blade of the type mentioned above is known from U.S. Pat. No. 4,727,788. The saw blade has recurring groups of teeth with one leading tooth and a number or trailing teeth. The leading tooth has the largest height and the heights in the group decrease, but can be constant also. The trailing teeth are set teeth in succession set left and right respectively to broaden the channel to be cut in the workpiece and to make it wider than the width of the basic body of the saw blade. The leading tooth may be provided with a phase also. The production of the teeth having different heights is performed by milling or by the use of a beating tool deforming the tips of the teeth in the running direction of the saw blade during use. This is followed by a grinding process in order to form the cutting sections of the teeth in the in different height levels. The part of the grinded cutting sections being effective during use decreases from tooth to tooth in the group as the height decreases so that the essential cutting work is done by the leading tooth, while the two trailing teeth broaden the channel to allow free cutting.

A saw blade having recurring groups of teeth is known from DE 33 00 791 C2. This saw blade has a first recurring group of teeth having a large common height and a second recurring group having a small common height. The first group of teeth comprises unset and set teeth. The second group of teeth comprises unset and set teeth. However, each group can have teeth of two different heights. Each tooth has a first and second rake angle being different from each other. Each tooth has a first and second clearance angle being different from each other. The two different rake angles and clearance angles provided at each single tooth can be made by plastic deformation of the tip of the tooth especially by displacing material of the tooth using a deformation device being driven in a sharp angle with respect to the running direction of the band. Doing this the height of the tooth is reduced at the same time. The amount of displacing can be controlled by adjusting the stroke of the deformation device. The forming of the teeth can be performed by milling and grinding also. A succession of teeth is formed by the plastic deformation of one tooth after the other. There is a height difference between the common large height of the teeth of the first group and the common small height teeth of the second group. There is also a difference between the common rake angle of the high teeth with respect to the low teeth and between the common clearance angle of the high teeth and the common clearance angle of the low teeth. Different depths and variable pitch may be applied also with respect to each of the groups. The plastic deformation of the high teeth is the same with respect to each high tooth. Thus, all of the high teeth after deformation have a common rake angle. It is not described whether the height difference between the high teeth and the low teeth results partly by profiling or by plastic deformation respectively.

SUMMARY OF THE INVENTION

The invention is based on the object of providing a saw blade of the described at the beginning which, on the one hand, can be produced with reasonable expenditure and which, on the other hand, has very large rake angles, reduced vibration characteristics, and different frequency and shape of the chips during use.

According to the invention, this is achieved in the case of a saw blade of the type described above by all of the trailing teeth having a different plastic deformation at their tips by displacement of material in the running direction of the saw blade, each of the trailing teeth having both a positive enlarged rake angle and a reduced height with respect to the leading tooth generated by the different plastic deformation.

The invention starts from the idea that at least all of the trailing teeth have different rake angles made by different plastic deformation of the tips of each of the trailing teeth. The profiling of the teeth before the plastic deformation can be done by milling, but by grinding or punching also, even by energetic jet forming. The term "different plastic deformation" covers and uses positively even such differences being unavoidable tolerances. Thus, for example, larger tolerances during production of the milling tool or of the grinding wheel used for profiling can be allowed. While is was intended to keep the tolerances as low as possible the invention uses the contrary way. The same idea is used with respect of the manufacture and the drive and the control of the deformation device. On the other hand, it is possible also to allow larger differences or to use deliberately larger differences. This can be done by profiling the trailing teeth with different heights, especially by profiling the trailing teeth pair by pair to be positioned at different height levels to each other after plastic deformation.

In addition, different strokes of the deformation device can be used to enhance and to enlarge the differences. The teeth after profiling have raw rake angles. The teeth after plastic deformation have enlarged positive rake angles in a range which cannot be done by milling or grinding alone. The different plastic deformation occurs by displacement of material within the longitudinal center plane of the saw blade. The displacement of the material generally takes place in an inclined direction with respect to the running direction of the saw blade during use. The material in the area of the tips of the teeth is displaced into another location keeping the volume constant and having a component extending in the running direction of the band. Doing this two essential features occur. An increasing positive rake angle is combined with a decreasing height level of the trailing teeth, always with respect to the shape of the raw teeth after profiling. It is especially advantageous to plastically deform the trailing teeth pair by pair differently. The pairs of trailing teeth belonging together can be positioned on different height levels by different plastic deformation. The different plastic deformation of pairs of trailing teeth to be positioned on different height levels always matches with different setting widths. The pair of trailing teeth being positioned on the lowest height level has the largest setting width. The pair of trailing teeth being positioned on the highest height level has the smallest setting width. The pairs of trailing teeth being positioned between have a setting width lying between. In this connection there is no allocation with respect to the succession of the teeth in the group. In the group the succession of the teeth is in any order whatever. Only the projection of the teeth in the running direction is important. Even the two teeth belonging to a common pair of trailing teeth must not be positioned in direct succession in the group. The two trailing teeth belonging to a common pair being positioned on a common height level and having heights at least nearly equal can be separated by a leading tooth. It is not disadvantageous if the two trailing teeth belonging to a common pair have slightly different rake angles and slightly different heights. In all cases the trailing teeth after different plastic deformation are not grinded but only set.

The saw blade according to the invention has a number of advantages. The vibration characteristics are reduced by the different rake angles resulting from different plastic deformation and allowing larger tolerances. This results in a different frequency and shape of the chips promoting a smooth running of the saw blade during use, lengthening lifetime, and improving cutting characteristics. Extremely large positive rake angles can be achieved which cannot be produced by milling or grinding alone. The cutting edges become sharper by the plastic deformation of the tips which can be performed by forming by upsetting, but also by rolling or similar treatment. During the plastic deformation the fin produced by profiling at each tip of a tooth is shaped so to extend in the running direction of the saw blade. The saw blade according to the invention can be produced with reasonable expenditure and in a very simple manner. Especially all of the teeth in the group can be subjected to a common plastic deformation step, being performed more or less at the same time. The different plastic deformation can be achieved with respect to different height levels. These height levels can be connected to each other by proportional steps. For example, for a group of seven teeth it is useful to deform the leading tooth having a raw rake angle after profiling of about 10° so that after plastic deformation it has an effective rake angle of about 15°. The leading tooth has the largest height. The trailing teeth after profiling can have raw rake angles of about 10° also. The first pair of trailing teeth is plastically deformed to a larger extent, so that it has an effective rake angle of about 17°, a height difference −x with respect to the leading tooth and a setting width over the band width of about one third of the maximum setting width of the pair of trailing teeth being mostly deformed. The second pair of trailing teeth is plastically deformed to an even larger extent. An effective rake angle is intended to be about 19°, a height difference of about −2x with respect to the leading tooth and a setting width of about two thirds of the maximum setting width of the pair of trailing teeth being mostly deformed. The third pair of trailing teeth is the one being mostly deformed. It gets an effective rake angle of about 21°, a height difference of about −3x with respect to the leading tooth and the maximum setting width. The succession of the teeth in the group is in any order whatever. The same thing is true for other numbers of teeth in the group. The trailing teeth are set teeth to the left and the right and arranged on different height levels. Each pair is positioned on a common height level. The projection of all of the teeth in the group in the running direction is designed in a manner so that discrete strip-like chip removal areas result which do not overly. The chip removal areas are located side by side in succession.

The leading tooth also can have a different plastic deformation with respect to the trailing teeth. the leading tooth has both an enlarged positive rake angle and a less reduced height with respect to the trailing teeth. The profiling of the raw teeth in the group is performed by milling. Especially all of the teeth in the group are milled together. The raw teeth profiled in this manner can have the same or different shape especially with respect to the heights and/or one or more positive or neutral raw rake angles and raw clearance angles.

The at least one leading tooth can comprise the positive enlarged rake angle at its tip in the range between about 5° and 25°—preferably about 15°—and the trailing teeth can comprise positive enlarged rake angles in the range between about 5° and 30°—preferably between 17° and 21°—. In general the effective rake angles of the trailing teeth are larger than the effective rake angle of the leading tooth, because the trailing teeth normally are deformed to a larger extent than the leading tooth. The reason for this can be the height difference. The trailing teeth can be plastically deformed to be arranged on different height levels. Equal steps can be provided between adjacent height levels. Decreasing height is combined with increasing setting width. It is possible also to mill the raw teeth with different raw rake angles the teeth having equal or different wedge angles between rake angle and clearance angle.

The saw blade can have a height difference between the height of the leading tooth and the height of a trailing tooth in the range of about 0.05 mm to 0.30 mm—especially between 0.08 and 0.15 mm—. This height difference can be preformed in whole or partly during profiling of the teeth. The final height difference appears after the plastic deformation of the tips of the teeth and the setting of the trailing teeth respectively. The term "height of the set teeth" can cover a medium height or a maximum height, i.e. the maximum height of the inner edges of the set trailing teeth. The height difference should be designed not too large in order not to make the chip removed by the leading tooth too thick. If trailing teeth are arranged in pairs on different height levels or in different planes respectively, the maximum deformation of the lowest pair of trailing teeth must not override the maximum deformability of the material.

The leading tooth can have a phase angle in a range between 30° and 60°. The shape and the positioning of the phase may be designed so that only about the outer half of each set trailing tooth and/or the inner half of each unset leading tooth is effectively doing cutting work during use. This corresponds with a group of three teeth.

In all embodiments the phase angle of the leading tooth and the setting widths of the trailing teeth can be combined to each other in a manner so that the load and the stresses of the saw blade is distributed substantially equally to all of the teeth.

In a method for the production of a saw blade comprising a basic body lying in a longitudinal center plane and having an edge and including along its edge a group of recurring teeth, the group comprising at least one unset leading tooth being provided with a phase and having an effective cutting-edge section and a preferably even number of trailing teeth, the leading tooth having a larger height than all of the trailing teeth, first all of the teeth are profiled to form raw teeth, then the tips at least of the trailing teeth are plastically deformed by displacement of material with respect to the running direction of the saw blade and in the longitudinal center plane in different manner each so that each trailing tooth comprises both a positive enlarged rake angle and a height being smaller than the height of the leading tooth, thus at least one leading tooth and a number of trailing teeth are formed in the group. Finally the one or the more leading teeth in the group is provided with a phase by milling and the trailing teeth are set.

During production the raw band of bimetal is profiled in a known manner to form raw teeth, for example by milling. The raw band is profiled in sections, each section getting a number of raw teeth at the same time. Usefully the number of raw teeth in the section can coincide with the number of teeth in the group. The simplest way of manufacture is to profile all of the raw teeth getting the same height and the same shape. Tolerances due to manufacture are used deliberately, the even are desired. Then the different plastic deformation follows making the raw teeth to at least one leading tooth and trailing teeth. Even during this step of manufacture unavoidable tolerances are allowed and deliberately used to reach different shapes, and different rake angles. The leading tooth and the trailing teeth are formed to have differently enlarged positive rake angles and different heights. The heights of the trailing teeth as far as a pair is concerned have nearly the same height forming a height difference with respect to the height of the leading tooth. This different shaping is advantageous with respect to vibration characteristics of the saw blade during use. A heat treatment of the teeth is possible. Finally the leading tooth in the group is provided with a phase by grinding and the trailing teeth are set. The setting of the trailing teeth is done in pairs. A number of pairs may be set in a common step, i.e. at the same time. The setting width of pairs to each other may be preferably different.

All of the teeth can be profiled with common shape to form raw teeth having especially the same raw height and the same raw rake angle, and other raw teeth designed to form the trailing teeth are plastically deformed to a larger extent than the leading tooth.

On the other hand, all of the teeth can be profiled with different shape to form raw teeth having especially different heights and thus the leading tooth and the trailing teeth are preformed. Afterwards the tip of the so preformed leading tooth and the tips of the so preformed trailing teeth in the group are plastically deformed in a manner so that the leading tooth and each of the trailing teeth in the group comprise both an enlarged positive rake angle and a reduced height with respect to the height of the leading tooth.

The trailing teeth, especially pair by pair, after their profiling are swaged to be positioned on different height levels arranged in steps. The steps of decreasing height differences are combined with steps of increasing rake angles and increasing setting width differences. The succession of the teeth in the group is in any order whatever. The height differences from step to step, i.e. from pair to pair, may be designed in a range of about 0.05 mm. The differences of the rake angles from pair to pair may be about 2°.

It is advantageous for all of the production methods to differently plastically deform the tips of the leading tooth and of the trailing teeth at least of a group in a common step, i.e. more or less at the same time. The strokes of the deformation device with respect to the raw teeth overly each other at least partly. Independent from this a constant or a variable pitch may be applied.

BRIEF DESCRIPTION OF THE DRAWINGS

The invention is further explained and described with reference to a number of illustrative embodiments. In the drawings shows.

DETAILED DESCRIPTION

Figure 1A:
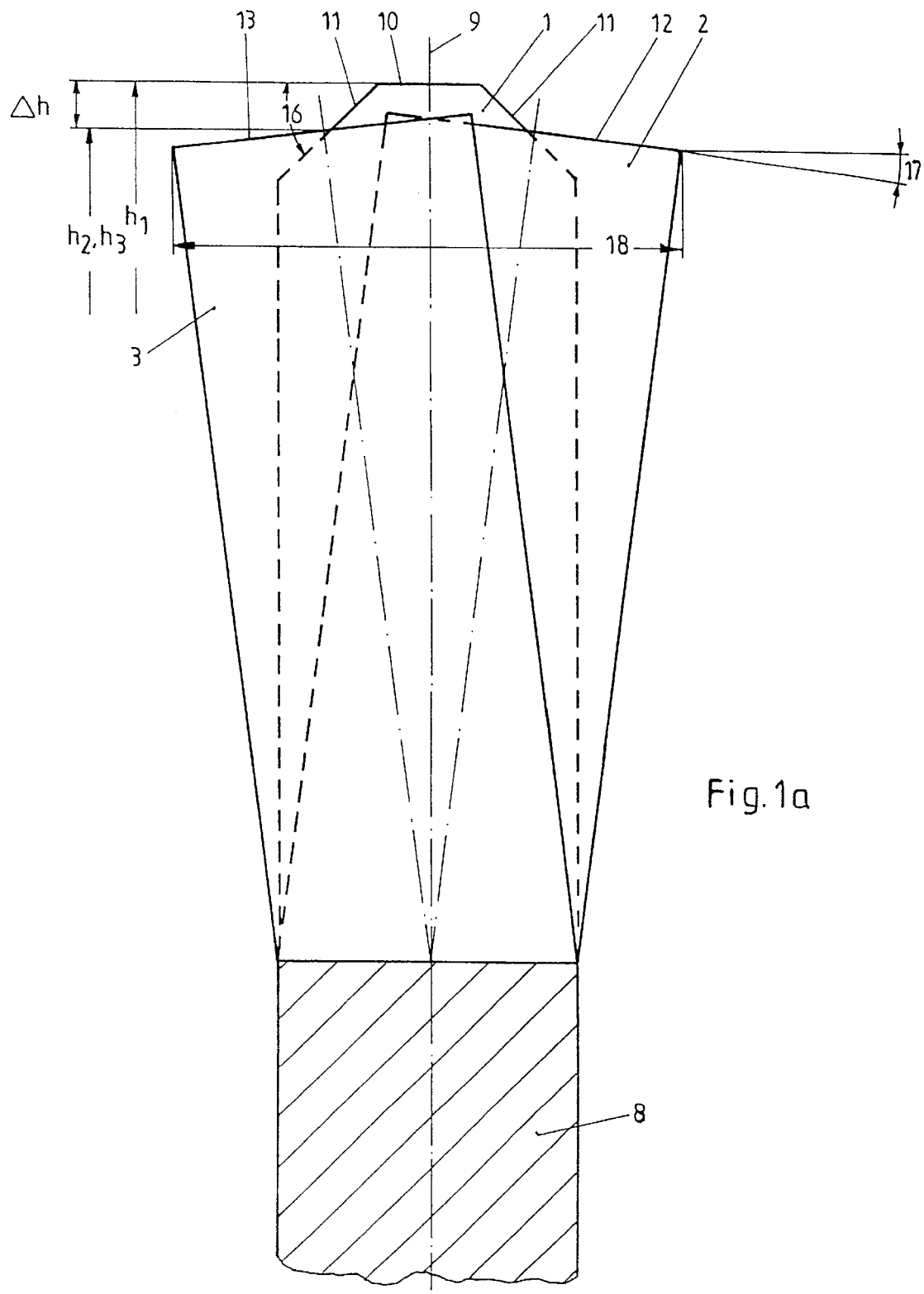
FIG. 1a a projection of a cycle of teeth of the saw blade in a first embodiment seen in the direction of the blade, FIG. 1b a projection view of a cycle of teeth of the saw blade in a second embodiment seen in the direction of the blade, FIG. 2 a side view of a raw saw blade having raw teeth and being contoured by milling, FIG. 3 a side view of a deformation device with respect to the raw teeth of the saw blade of FIG. 2, FIG. 4 a side view of the saw blade of FIG. 2 after plastic deformation of the raw teeth, FIG. 5 a tooth of the saw blade in enlarged scale, FIG. 6 a further embodiment of the saw blade, FIG. 7 a side view of an embodiment of the saw blade having teeth positioned on different height levels, FIG. 8 the plan view of the saw blade of FIG. 7, FIG. 9 the projection view of the saw blade of FIG. 7 and 8, FIG. 10 a side view of a further embodiment of the saw blade having teeth positioned on different height levels, FIG. 11 the plan view of the saw blade of FIG. 10, FIG. 12 the projection view of the saw blade of FIGS. 10 and 11, FIG. 13 a side view of a further embodiment of the saw blade having teeth positioned on different height levels, FIG. 14 the plan view of the saw blade of FIG. 13, FIG. 15 the projection view of the saw blade of FIGS. 13 and 14, FIG. 16 a side view of a further embodiment of the saw blade having teeth positioned on different height levels, FIG. 17 the plan view of the saw blade of FIG. 16, and FIG. 18 the projection view of the saw blade of FIGS. 16 and 17.
Figure 1B:
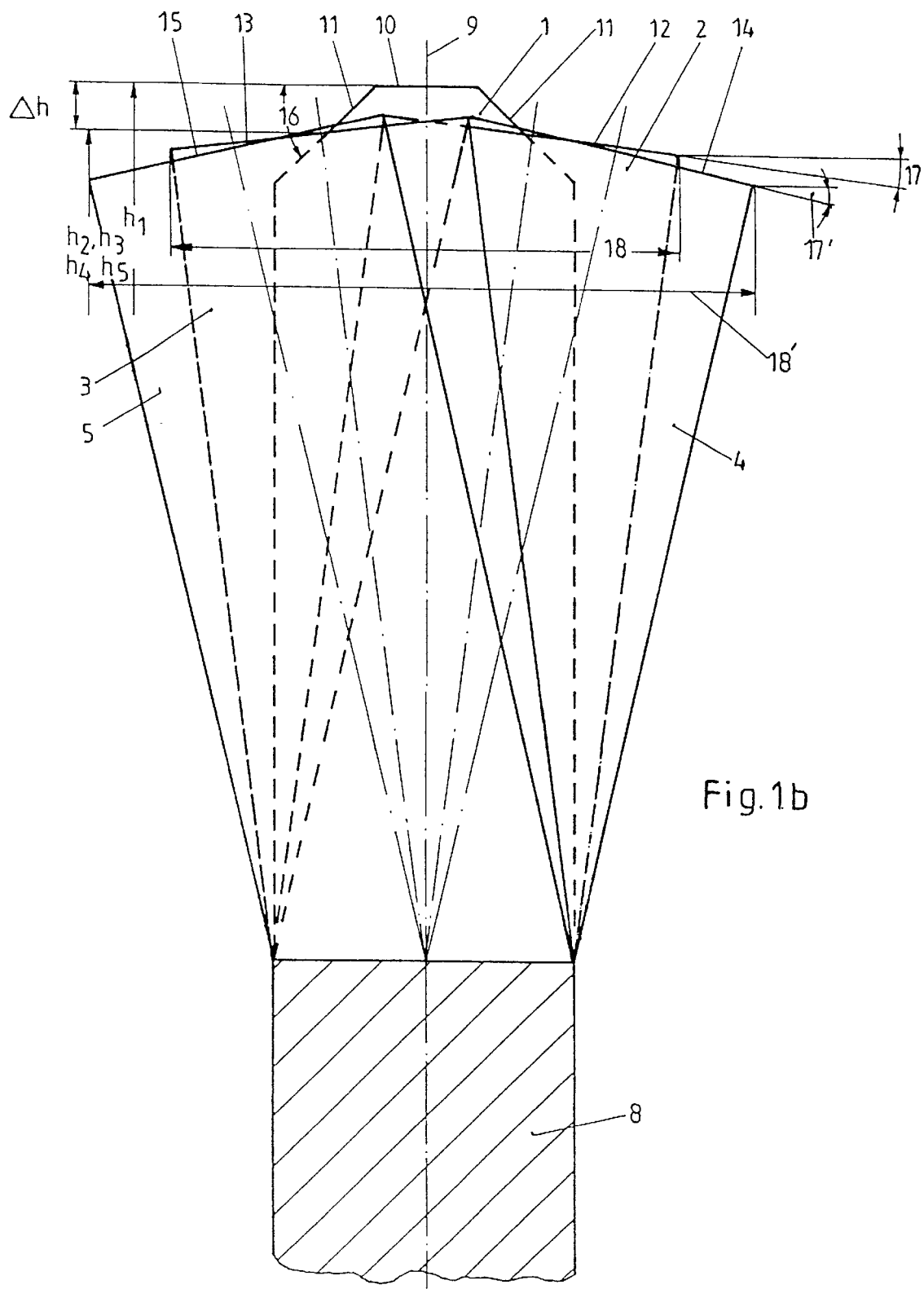

FIGS. 1a and 1b illustrate the general arrangement and shape of the teeth of the saw blade. There is provided a leading tooth 1 and a plurality of trailing teeth 2, 3, 4, 5, . . . . The leading tooth 1 and the trailing teeth 2, 3, . . . are arranged in recurring cycles or groups 6. Each group 6 is a sequence of teeth, in which the teeth are arranged in succession one after the other. The groups 6 also are arranged one after the other. The trailing teeth 2, 3, . . . always are provided in even numbers. Thus, pairs of trailing teeth are formed. The leading tooth 1 always is a straight unset tooth. The trailing teeth 2, 3, 4, 5, . . . always are set teeth. The setting of the teeth in succession alternates from left to right or vice versa respectively. The leading tooth 1 always has a larger height than the trailing teeth 2, 3, . . . .

Figure 6:
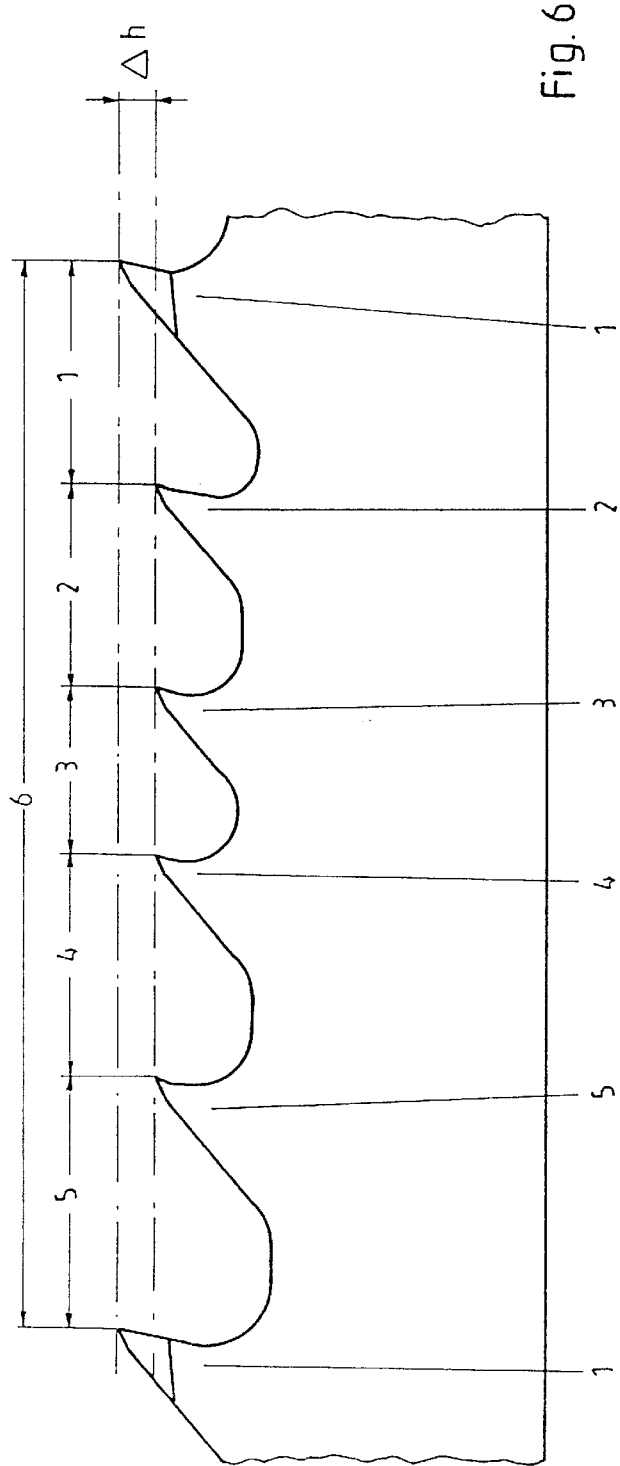

FIGS. 1a and 2 to 4 illustrate the most simple embodiment having the smallest group 6 of teeth. The group 6 has a leading tooth 1 and two trailing teeth 2 and 3. FIGS. 1b and 6 show a group 6 of a leading tooth 1 and four trailing teeth 2, 3, 4 and 5. The next possible embodiment (not shown) is a group 6 of one leading tooth 1 and six trailing teeth 2, 3, . . . .

The single leading tooth 1 of a group 6 is a straight tooth, the width of which corresponds to the width of the raw band 7 or the basic body 8 of the saw blade respectively. The leading tooth 1 is formed symmetrically with respect to a longitudinal center plane 9 extending through the basic body 8. A cutting-edge section 10 located straight and perpendicular with respect to the longitudinal center plane 9 is provided in the middle of the tips of the leading tooth 1. As shown in FIGS. 1a and 1b the cutting-edge section 10 of the cutting edge of the leading tooth 1 is effective with its whole extension doing cutting work. In symmetrical arrangement left and right the straight cutting-edge section 10 is continued with an inclined section 11 called phase. This section 11 extends below the cutting edges 12, 13, 14, 15 of the trailing teeth 2, 3, 4, 5. This means that only the straight cutting-edge section 10 and the inner part of the sections 11 of the leading tooth 1 and the outer sections of the cutting edges 12, 13, 14, 15 of the trailing teeth 2, 3, 4, 5 of the fully manufactured saw blade are doing cutting work during use of the saw blade. The leading tooth 1 has a height $h_1$. The trailing teeth 2 and 3 have heights $h_2$ and $h_3$ respectively. The heights $h_2$ and $h_3$ may be slightly different, but are very similar. To the contrary the height $h_1$ of the leading tooth 1 is larger, so that a height difference $\Delta h$ results. The inclined sections 11 of the cutting edge of the leading tooth 1 are arranged with a phase angle 16 between 30° and 60°. The setting of the trailing teeth 2, 3, . . . is performed with a setting angle 17 corresponding with a setting width 18. The setting of the trailing teeth 2, 3, . . . is done generally in pairs. The setting of each following pair of trailing teeth may increase with respect to the desired broadening of the cutting channel in the workpiece, but on the other hand may stay constant, if the following pair is intended to work in the depth direction of the cutting channel with respect to infeed. The setting even may decrease. It is possible also to use different setting of the pairs of the trailing teeth. The height difference $\Delta h$ and the phase angle 16 and the arrangement of the section 11 with respect to the longitudinal center plane 9 are designed with respect to each other in a manner, so that the inner edges of the trailing teeth 2, 3, . . . are covered by the shape of the leading tooth 1 doing no cutting work as shown in the projection of FIG. 1. Thus, only the outer edges of the trailing teeth 2, 3, . . . cut during use of the saw blade. This is contrary with the leading tooth 1.

Figure 2:
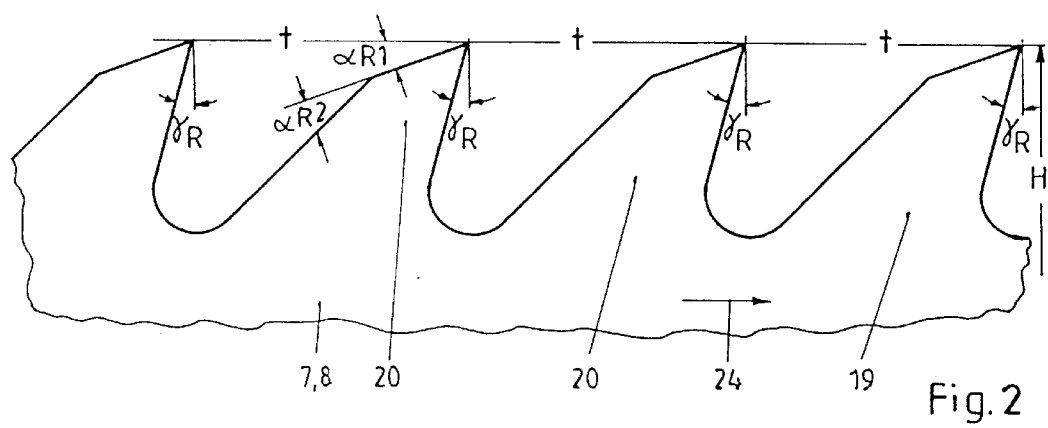

It is important for the production of such a saw blade to form raw teeth 19 and 20 (FIG. 2) first and a raw band 7, for example by milling. All of the raw teeth 19 and 20 may be formed with equal shape and equal raw height H as illustrated in FIG. 2. The raw teeth 19 and 20 may be arranged with constant pitch t. But it is also possible that the raw teeth 19 are formed in a manner so that they have an association to the leading tooth 1, which means that the raw teeth 19 during manufacturing are formed into the leading teeth 1, while the raw teeth 20 during production are treated to become trailing teeth 2, 3, . . . The raw teeth 20 may have a different height compared with the raw teeth 19. But FIG. 2 shows the same height for the raw teeth 19 and 20 being arranged with constant pitch simply by milling. The raw teeth 19 and 20 are shaped to have common positive raw rake angles gamma$_R$ and first raw clearance angles $\alpha_{R1}$ and second raw clearance angles $\alpha_{R2}$. But it is not necessary to shape the raw teeth with two different raw clearance angles. It is sufficient also to form the raw teeth with only one raw clearance angle.

Figure 3:
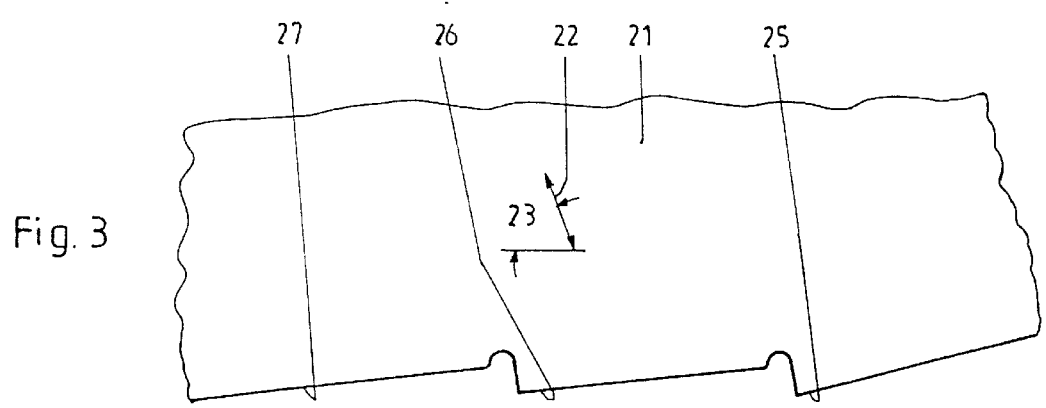

All of the profiled raw teeth 19 and 20 are further subjected to different plastic deformation. The different plastic deformation of the raw teeth 19 and 20 can be achieved especially for a complete group 6 of teeth, i.e. substantially at the same time. This can be seen from a common look to FIGS. 2 and 3. FIG. 3 shows a deformation device 21 extending in longitudinal direction over a group 6 of teeth and being driven in a stroke-like manner in a direction according to the double headed arrow 22. The motion according to the double headed arrow 22 is achieved with a sharp deformation angle 23 with respect to the running direction 24 of the saw blade and within the longitudinal center plane 9. The deformation device 21 has a first actuation surface 25, which by its arrangement and shape is assigned to the plastic deformation of the tip of the raw tooth 19 in order to generate the cutting edge and the rake angle gamma$_1$ and the clearance angle $\alpha_1$ of the leading tooth 1 in a manner so that the height $h_1$ of the tip of the leading tooth 1 with its cutting-edge section 10 is formed at the same time. The deformation device 21 comprises a second actuation surface 26 assigned to the plastic deformation of the tip of the raw tooth 20 in order to generate the first trailing tooth 2. The actuation surface 26 forms the tip and the cutting edge 12 respectively of the trailing tooth 2 by plastic deformation so that the raw rake angle gamma$_R$ is deformed into the rake angle gamma$_2$ with respect to the extension of the plastic deformed part at the tip of the trailing tooth 2. In addition, the tip is deformed in a manner so that the height $h_2$ of the trailing tooth 2 results, this height being positioned with the height difference $\Delta h$ to the height $h_1$ of the leading tooth 1. It is readily possible that the raw tooth 20 of FIG. 2 deformed later into the trailing tooth 2 already has been profiled with a smaller height compared with the height of the raw tooth 19 so that the height difference $\Delta h$ results partly from profiling partly from plastic deformation.

The deformation device 21 in a simple embodiment comprises a third actuation surface 27 assigned to the plastic deformation of the tip of the second raw tooth 20 (FIG. 2) in order to generate the second trailing tooth 3. The trailing tooth 3 achieves its height $h_3$ and its rake angle gamma$_3$ by this plastic deformation. The trailing teeth 2 and 3 do not have exactly the same shape, but differences with respect to tolerances due to production steps during profiling (FIG. 2) and to a larger extent also during plastic deformation (FIG. 3). These differences in tolerances are deliberately kept larger especially with respect to the heights $h_2$ and $h_3$ and with respect to the rake angles gamma$_2$ and gamma$_3$. It can be seen from FIG. 3 also that the first actuation surface 25 is arranged with distance in a backward direction with respect to the two other actuation surfaces 26 and 27 so that during the plastic deformation the actuation surfaces 26 and 27 first contact the tips of the raw teeth 20, while contact of the actuation surface 25 with the tip of the raw tooth 19 starts after a certain stroke free of contact. Despite of this this plastic deformation is called a common plastic deformation of all of the raw teeth 19 and 20 of a group 6 happening more or less at the same time. But it is possible also to divide the deformation device 21 in several parts and to control the strokes of the parts separately and with respect to each other. The different plastic deformation of the tips of the raw teeth 19 and 20 in the direction of the longitudinal center plane 9 can be performed by forming by upsetting, but also by rolling or similar treatment. During rolling the plastic deformation occurs more or less in timely relation one tooth after the other. It is possible also that the deformation device 21 has a larger extension than the group 6 of the teeth so to deform two following groups 6 of raw teeth at the same time. It is important that it is a different plastic deformation of the tips of the raw teeth 19 and 20. Beside the difference in height an increase of the positive rake angle results. Thus, rake angles on the leading tooth 1 and on the trailing teeth 2, 3, . . . can be produced which cannot be produced by milling alone. During the plastic deformation the fin produced by profiling at each tip of a tooth is shaped so to extend in the running direction 24 of the saw blade. This increases the sharpness of each tooth. The rake angles at the tips of the leading tooth 1 and the trailing teeth 2, 3 . . . differ from each other. This has a positive effect in reducing vibration characteristics of the saw blade during use so that a different frequency and shape of the chips results promoting a smooth running of the saw blade during use, lengthening lifetime, and improving cutting characteristics.

After the plastically deformation of the tips of the teeth resulting in a height difference $\Delta h$ or completing the height difference the leading tooth 1 in the group 6 is provided with the phase and the trailing teeth 2, 3, . . . are set.

Figure 5:
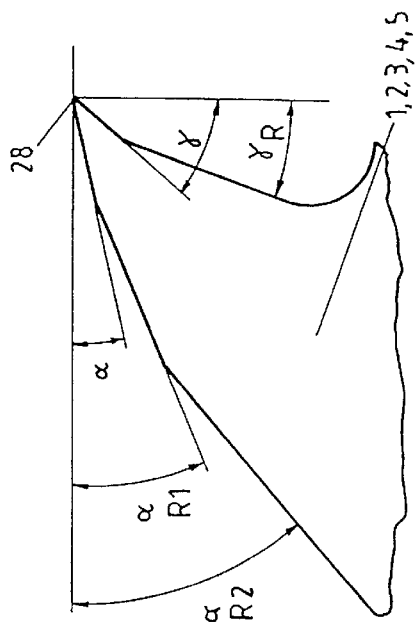

FIG. 5 illustrates in enlarged scale a leading tooth 1 or a trailing tooth 2, 3, . . . , which have been milled to have a raw rake angle gamma$_R$ and two raw clearance angles $\alpha_{R1}$ and $\alpha_{R2}$. Then the plastic deformation takes place whereby at the tip 28 a positive rake angle gamma and a clearance angle $\alpha$ have been formed, while the wedge angle of the tip of the tooth has been kept substantially constant.

Figure 4:
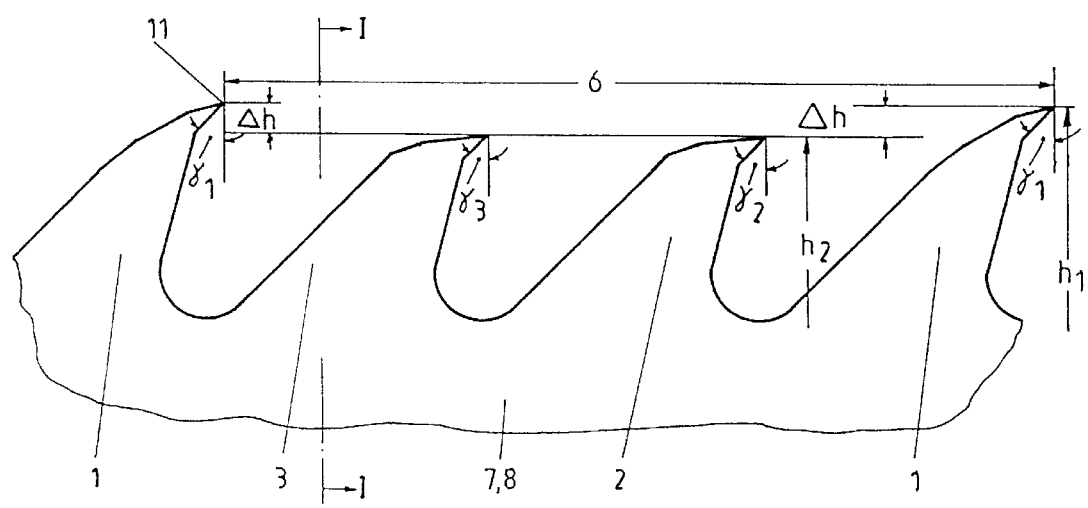

FIG. 6 illustrates a side view of a second embodiment of the saw blade, similar to the view of FIG. 4. A leading tooth 1 and four trailing teeth 2, 3, 4, 5 here are arranged in the group 6. In addition, variable pitch $t_1$, $t_2$, $t_3$, $t_4$ and $t_5$ is used. Here also the teeth are differently plastically deformed. Between the trailing teeth 2, 3, 4, 5 there are slightly height differences, while the height difference $\Delta h$ to the leading tooth 1 is of other size.

Figure 9:
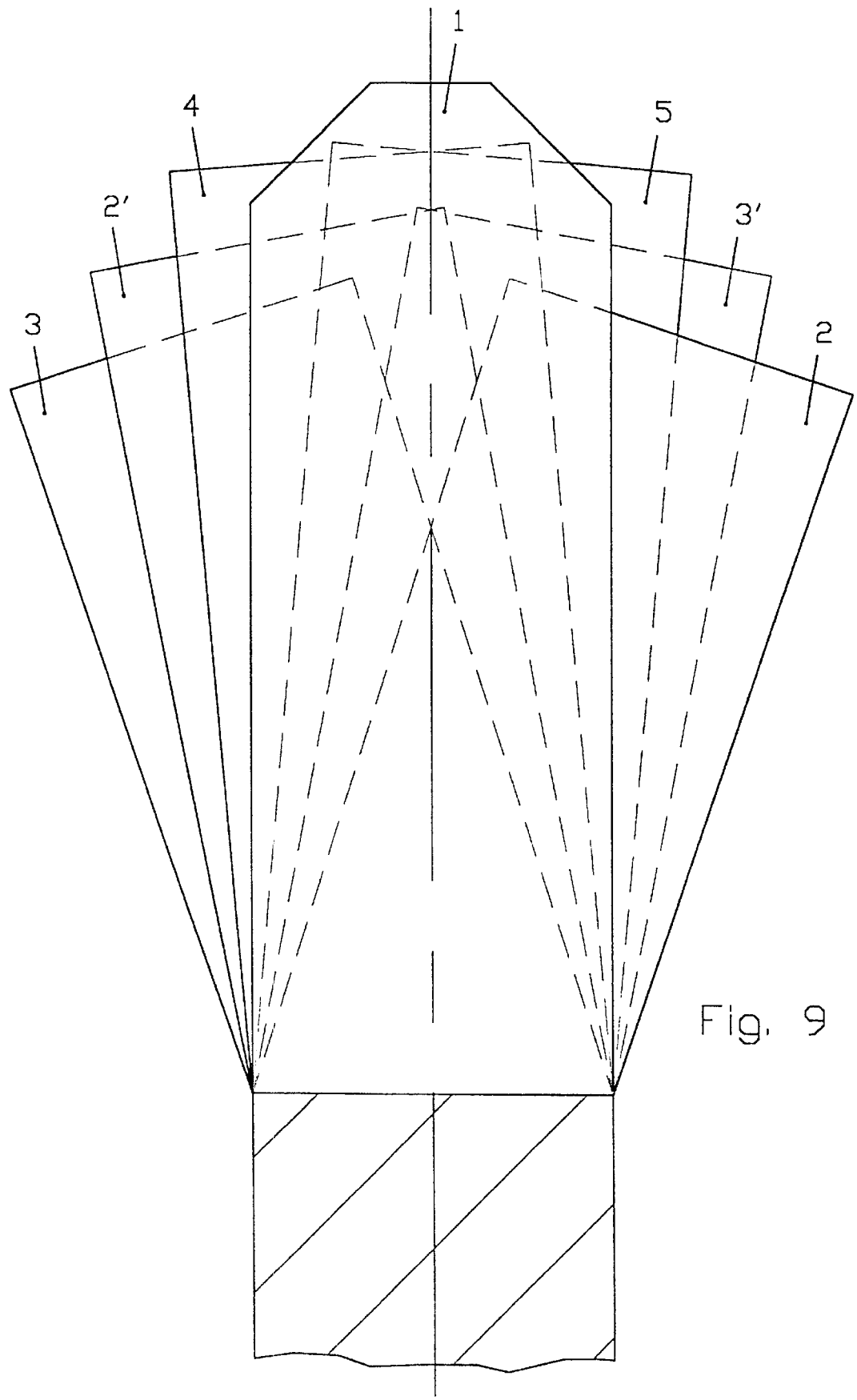

The embodiment of FIGS. 7 to 9 comprises a group 6 consisting of seven teeth. Each group 6 comprises one leading tooth 1 and three pairs of trailing teeth 2, 3; 4, 5 and 2', 3'. In FIGS. 7 and 8 lines for better understanding are shown. The lines in FIG. 7 illustrate different heights or height levels respectively. The lines of FIG. 8 explain the different setting widths extending over the width of the raw band. The pair of trailing teeth 2, 3 has the lowest height and the largest setting width. This is illustrated also in the projection view of FIG. 9. The trailing teeth 2 and 3 belonging to a common pair are not positioned in direct succession but arranged in the group in any order whatever. The pair of trailing teeth 4 and 5 is the pair having the largest height as far as the trailing teeth are concerned. Correspondingly they have the smallest setting width. The height of the trailing teeth 4 and 5 is not exactly the same, but forms a height difference $\Delta h$ with respect to the height of the leading tooth 1. The trailing teeth 4 and 5 are positioned on a first height level with distance to the height of the leading tooth 1. In the group 6 there are two further pairs of trailing teeth 2' and 3', the height level of which is positioned between the height levels of the pairs of trailing teeth 2, 3 and 4, 5. Correspondingly the setting width is in between. The teeth are arranged on different height levels provided in steps. The steps, i.e. the height difference from one height level to the adjacent height level, can be equally designed. The same stepping as to the steps of the setting width. The succession of the teeth in the group is in any order whatever. It is useful to keep the alternating change of a trailing tooth set to the left with one set to the right. But even this condition must not be fulfilled.

FIG. 9 illustrates that for the removal of the chips out of the channel to be cut the only essential fact is the projection of the teeth. The succession of the teeth in the group is in any order whatever. Each tooth is doing cutting work only with its section extending over the projection of the other teeth. In this manner chips are removed out of the channel to be cut in strip-like shape, which in the projection lie side by side and do not overly each other. The load and the stresses are distributed in a substantially equal manner to all of the teeth in the group. FIG. 9 shows the pair of trailing teeth 2, 3, having the largest setting width is not only doing cutting work with its outer sections of the cutting edges, but also with a section 29, extending the projection of the teeth 1 and 4 and 1 and 5 respectively. There are further sections in the group of teeth which act correspondingly.

The production of the saw blade of FIGS. 7 to 9 can be effected in a manner so that first the profiling of all of the raw teeth takes place for example by milling the teeth to have a raw rake angle of about 10° and a common height of the raw teeth. This profiling is done preforming a variable pitch. Then, the different plastic deformation of the teeth takes place, which is effected in a common deformation step for all of the teeth belonging to a group. But at the individual tooth differing deformations are effected. Thus, the leading tooth 1 for example is swaged to get a height having a height difference of about 0.15 mm with respect to the raw height of the raw tooth and a rake angle at its tip of about 15°. The tip of the leading tooth 1 is positioned on a first height level. The pair of trailing teeth 4, 5 is swaged more with respect to the swaging of the leading tooth and is located on a second height level having a height distance from the raw height of about 0.20 mm for example. The trailing teeth 4, 5 are deformed to have a rake angle of about 17° at their tips. The tolerances due to profiling and/or to plastically deforming are deliberately kept and used in a manner to have slight differences after plastically deforming so that the pair of trailing teeth 4, 5 do have not exactly the same height level and not exactly the same rake angle. Differences with respect to the two teeth of a pair of trailing teeth 4 and 5 belonging together are allowed which are of other size than those between height levels. The further pair of trailing teeth 2', 3' is swaged from the raw height to a further height level which is located with a distance of about 0.25 mm lower than the raw height. The intended rake angle may be about 19°. The pair of trailing teeth 2, 3, having the lowest height after the plastically deformation has a height level of about 0.30 mm lower than the height of a raw tooth. The intended rake angle is about 21°. This example shows equally measured steps between the height levels having a distance from each other of about 0.05 mm. The stepping of the rake angles is about 2°. Correspondingly tolerances in the rake angles of about ±1° may be allowed for example. After the plastic deformation the leading tooth 1 is provided with the phase and the trailing teeth 2, 3, 4, 5, 2', 3' are set.

The pair of trailing teeth 2, 3 is the one having been deformed to the most extent. If the material of the band cannot take such a maximum deformation or the danger of breaks exists it is recommended to form the pair of trailing teeth 2, 3 to have a lower height after profiling with respect to the height of the other raw teeth and to have a deforming at the pair of trailing teeth 2, 3 the material can take. Correspondingly other pairs of trailing teeth can be profiled with lower height.

Figure 12:
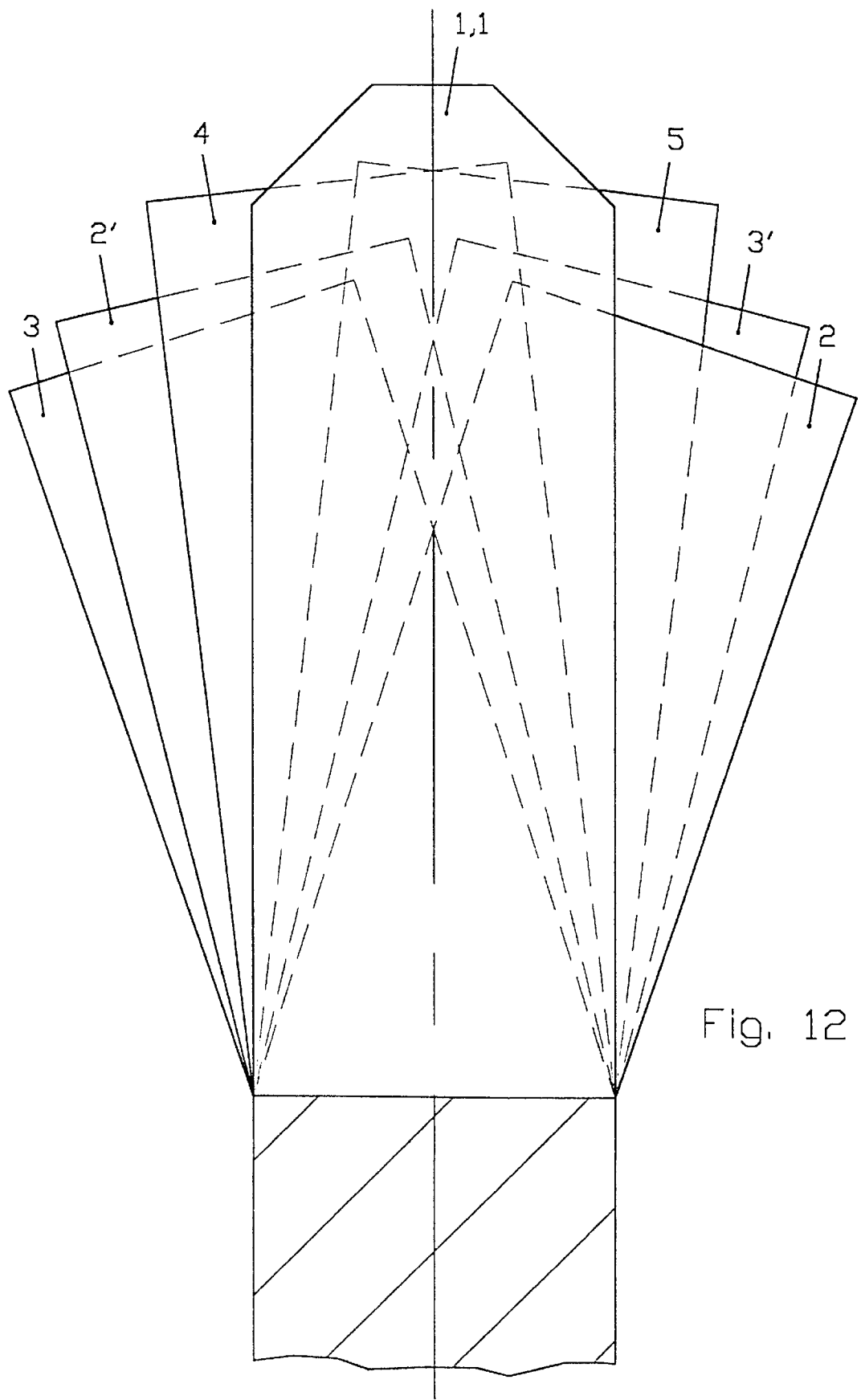

FIGS. 10 to 12 illustrate a further embodiment of the saw blade having a group of eight teeth. A lot of details are similar to the example of the embodiment of FIGS. 7 to 9 so that this description must not be repeated. The even number of teeth results from the double arrangement of a leading tooth 1 in the group. The further leading tooth 1 having the same shape as the leading tooth 1 at the beginning of the group is positioned in about the middle of the group. The teeth are arranged with variable pitch.

FIG. 10 illustrates a stepping of height having different steps from one height level to the adjacent height level. The enlarged detail shows the relation of the steps to each other. Between the height level of the swaged leading teeth 1 and the highest pair of swaged trailing teeth 4, 5 there is only a small height difference. The height difference between the height level of the swaged trailing teeth 4, 5 and the height level of the swaged trailing teeth 2', 3' is larger. The height difference to the last pair of trailing teeth 2, 3 is the largest height difference in the group. However, it is possible also to position different height differences in other order, decreasing instead of increasing or irregular for example.

FIG. 11 illustrates a stepping of the setting width showing decreasing steps. This especially can be seen in the enlarged detail. The smallest step is located between the setting level of the pair of trailing teeth 2', 3' and the setting level of the pair of trailing teeth 2, 3. This keeps the width of the chips removed out of the channel to be cut in the workpiece deliberately small. Thus, a good surface quality of the cut workpiece results. However, the arrangement of different steps with respect to setting widths can be effected in decreasing or in increasing steps or in a combination thereof in any order whatever.

The projection view of the teeth of FIG. 12 is similar with the projection view of FIG. 9, because the leading teeth 1 have the same shape and overly each other in the projection. The arrangement of different steps with respect to height differences between height levels and with respect to differences in setting widths between setting width levels is evident.

Figure 13:
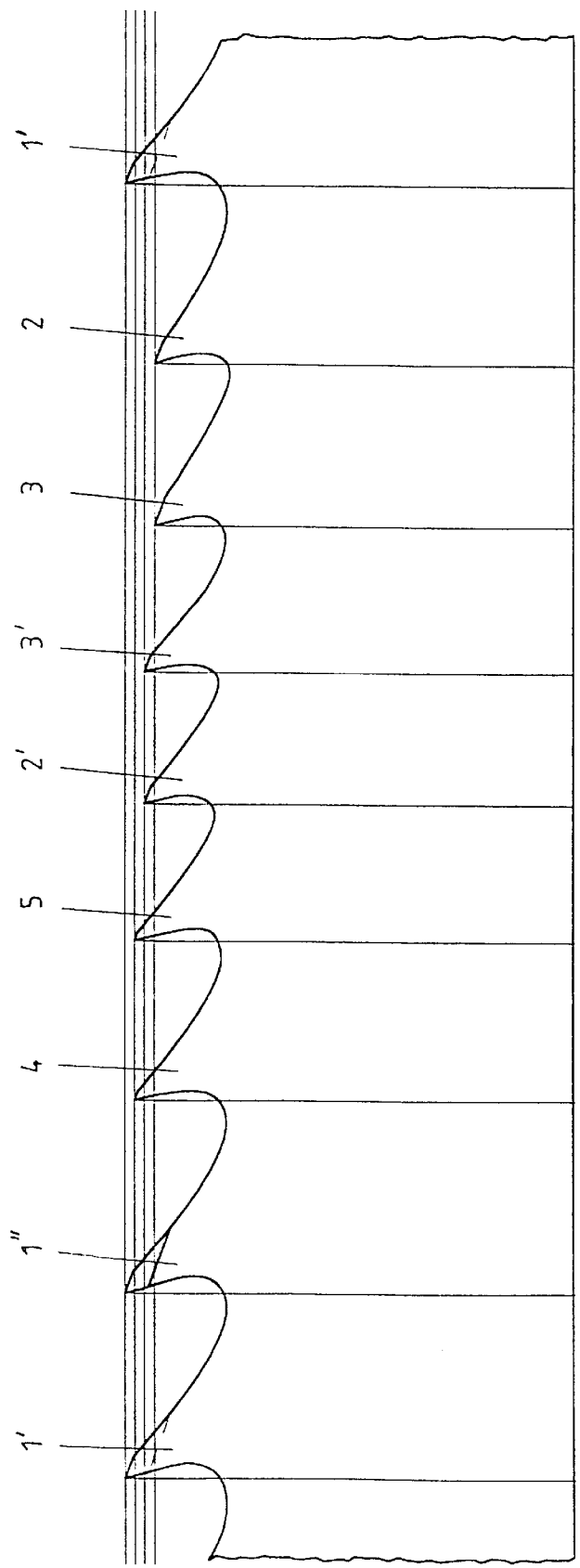
Figure 14:
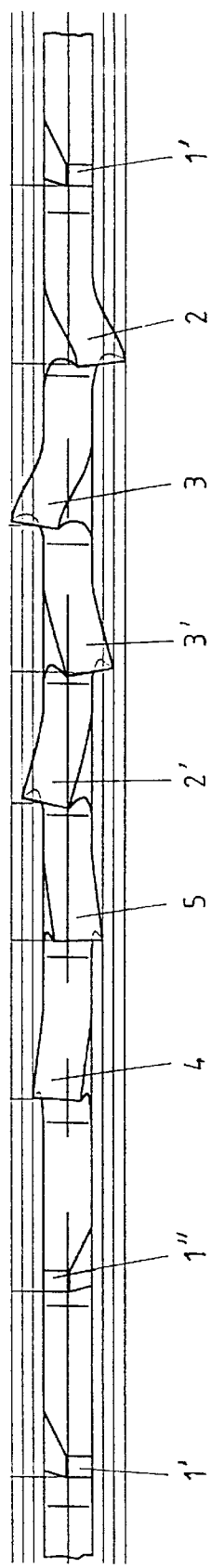
Figure 15:
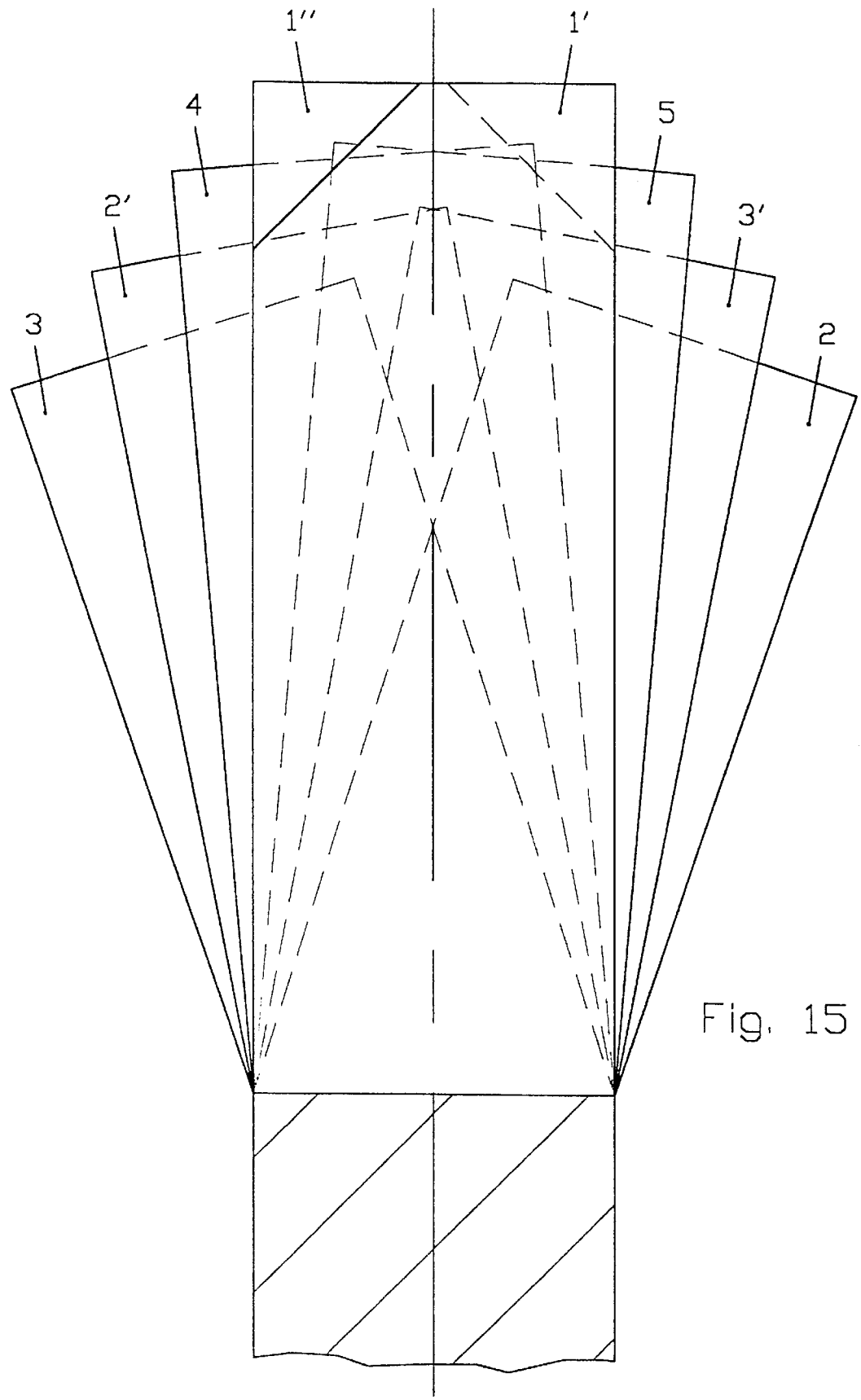

The embodiment of FIGS. 13 to 15 illustrates a group of eight teeth, but here two different leading teeth 1' and 1" are positioned in succession at the beginning of the group. The leading tooth 1' has a phase extending only to the one side and the leading tooth 1" is provided with a phase extending to the other side. The pairs of trailing teeth are arranged in succession to coincide with the stepping of height levels. After the leading teeth 1', 1" follows a pair of trailing teeth 4, 5 having the largest height level among the trailing teeth, then the pair of trailing teeth 2', 3' and then the pair of trailing teeth 3, 2 having the lowest height. Here also variable pitch is applied. But constant pitch may be applied alternatively. Here also the arrangement of the teeth in the group is of any order whatever.

Figure 18:
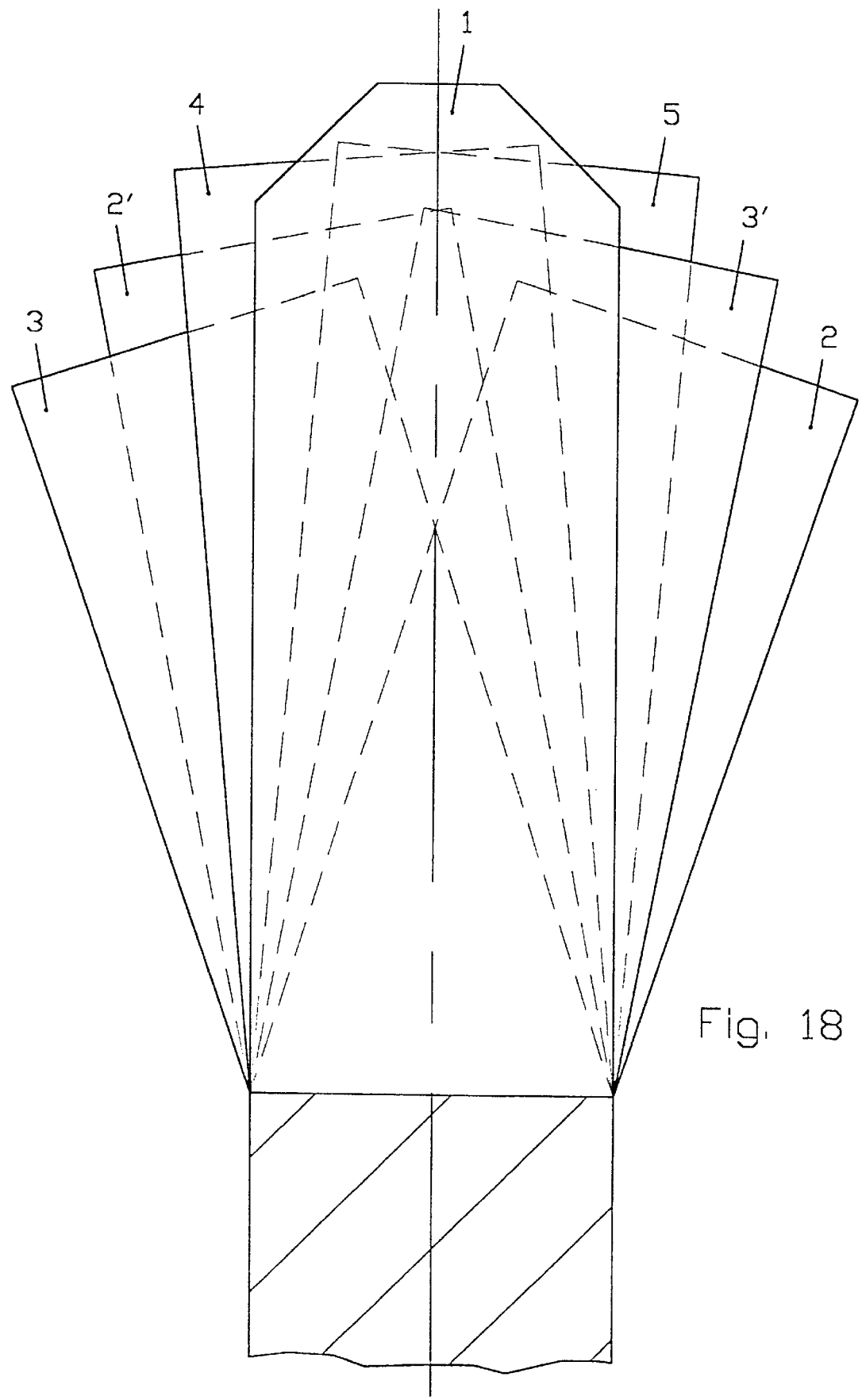

The embodiment of the saw blade of FIGS. 16 to 18 comprises nine teeth in the group. The leading tooth 1 is arranged three times in the group in distributed manner. Two trailing teeth each are positioned between two adjacent leading teeth. The enclosed two trailing teeth belong to different pairs of trailing teeth. But even here the projection view of FIG. 18 coincides with the projection view of FIG. 9.

LIST OF REFERENCE NUMERALS 1 leading tooth
2 trailing tooth
3 trailing tooth
4 trailing tooth
5 trailing tooth
6 group
7 raw band
8 basic body
9 longitudinal center plane
10 section
11 section
12 cutting edge
13 cutting edge
14 cutting edge
15 cutting edge
16 phase angle
17 setting angle
18 setting width
19 raw tooth
20 raw tooth
21 deformation device
22 double headed arrow
23 deformation angle
24 running direction
25 actuation surface
26 actuation surface
27 actuation surface
28 tip of a tooth

We claim:

1. A saw blade, comprising:

a basic body (8) being arranged in a longitudinal center plane (9), having an edge and including along its edge a (group (6) of recurring teeth (1, 2, 3, . . . );

said group (6) including at least one unset leading tooth (1) having a phase, an effective cutting-edge section (10) and a number of set trailing teeth (2, 3, . . . );

said leading tooth (1) having a larger height than all of said trailing teeth (2 3, . . . );

all of said trailing teeth (2, 3, . . . ) each having a different plastic deformation at their tips (28) by displacements of material in the running direction (24) of said saw blade within the longitudinal center plane (9);

each of said trailing teeth (2, 3, . . . ) having both a positive enlarged rake angle (gamma$_2$, gamma$_3$, . . . ) and a reduced height (h$_2$, h$_3$, . . . ) with respect to said leading tooth (1) being effected by said different plastic deformations.

2. The saw blade of claim 1, wherein said at least one leading tooth (1) includes a plastic deformation at its tip (28), said plastic deformation being different from said plastic deformations of said trailing teeth (2, 3, . . . ), said leading tooth (1) having both a positive enlarged rake angle (gamma$_1$) and a reduced height (h1) being larger than the reduced heights of each of said trailing teeth (2, 3, . . . ).

3. The saw blade of claim 2, wherein said at least one leading tooth (1) has the positive enlarged rake angle (gamma$_1$) at its tip (28) in a range between about 5° and 25° and said trailing teeth (2, 3, . . . ) have positive enlarged rake angles (gamma$_2$, gamma$_3$, . . . ) in a range between about 5° and 30°.

4. The saw blade of claim 1, wherein a height difference ($\Delta$h) exists between the height (h$_1$) of said leading tooth (1)

and the height ($h_2$) of said trailing tooth (2) in a range of about 0.05 mm to 0.30 mm.

5. The saw blade of claim 1, wherein said set trailing teeth (2, 3, . . . ) are swaged differently to be positioned on different height levels, the different height levels being arranged in steps, the steps combining decreasing height with increasing rake angles (gamma$_2$, gamma$_3$, . . . ) and increasing setting width.

6. The saw blade of claim 1, wherein the phase angle (16) of said leading tooth (1) and the setting widths (18) of said trailing teeth (2, 3, . . . ) are coordinated with each other in a manner such that the load and the stresses of said saw blade is distributed substantially equally to all of said teeth (1, 2, 3, . . . ).

7. The saw blade of claim 2, wherein said at least one leading tooth (1) has a positive enlarged rake angle (gamma$_1$) at its tip (28) of approximately 15°, and said trailing teeth (2, 3, . . . ) have positive enlarged rake angles (gamma$_2$, gamma$_3$, . . . ) in a range of approximately 17° to 21°.

8. The saw blade of claim 1, wherein a height difference ($\alpha h$) exists between the height ($h_1$) of said leading tooth (1) and the height ($h_2$) of said trailing tooth (2) in a range between 0.08 mm and 0.15 mm.

9. The saw blade of claim 1, wherein said set trailing teeth (2, 3, . . . ) are swaged differently pair for pair to be positioned on different height levels, the different height levels being arranged in steps, the steps combining decreasing height with increasing rake angles (gamma$_2$, gamma$_3$, . . . ) and increasing setting width.

10. The saw blade of claim 1, wherein all of said teeth are made of raw teeth (19, 20) having the same raw height (H) and the same raw rake angle (gamma$_R$), said raw teeth (20) being designed to form said trailing teeth (2, 3, . . . ) by being plastically defomed to a larger extent than said leading tooth (1).

11. The saw blade of claim 1, wherein all of said teeth are made of raw teeth (19, 20) having different heights ($H_1$, $H_2$, $H_3$), said tips (28) of said leading tooth (1) and of said trailing teeth (2, 3, . . . ) being plastically deformed in a manner such that said leading tooth (1) and each of said trailing teeth (2, 3, . . . ) in said group (6) has both an enlarged positive rake angle (gamma$_1$, gamma$_2$, gamma$_3$, . . . ) and a reduced height ($h_2$, $h_3$, . . . ) with respect to the height of said leading tooth (1).

12. The saw blade of claim 1, wherein the number of trailing teeth (2, 3, . .) is even.

\* \* \* \* \*